US011365150B1

(12) United States Patent
Griffard et al.

(10) Patent No.: US 11,365,150 B1
(45) Date of Patent: Jun. 21, 2022

(54) LIME HYDRATE WITH IMPROVED REACTIVITY VIA ADDITIVES

(71) Applicant: Mississippi Lime Company, St. Louis, MO (US)

(72) Inventors: Randy Griffard, St. Mary, MO (US); Martin L. Gran, Chesterfield, MO (US); William S. Allebach, Ste. Genevieve, MO (US); Paul J. Ramer, Ste. Genevieve, MO (US)

(73) Assignee: Mississippi Lime Company, St. Louis, MO (US)

( * ) Notice: Subject to any disclaimer, the term of this patent is extended or adjusted under 35 U.S.C. 154(b) by 3 days.

(21) Appl. No.: 16/511,168

(22) Filed: Jul. 15, 2019

Related U.S. Application Data

(60) Provisional application No. 62/700,143, filed on Jul. 18, 2018.

(51) Int. Cl.
*C04B 2/06* (2006.01)
*B01D 53/14* (2006.01)
*B01J 20/04* (2006.01)
*B01J 20/28* (2006.01)
*B01J 20/30* (2006.01)
(Continued)

(52) U.S. Cl.
CPC ............ *C04B 2/06* (2013.01); *B01D 53/1493* (2013.01); *B01D 53/502* (2013.01); *B01D 53/78* (2013.01); *B01J 20/041* (2013.01); *B01J 20/22* (2013.01); *B01J 20/223* (2013.01); *B01J 20/28016* (2013.01); *B01J 20/28059* (2013.01); *B01J 20/3021* (2013.01); *B01J 20/3085* (2013.01); *B01D 2251/404* (2013.01)

(58) Field of Classification Search
CPC ......... C04B 2/04; C04B 2/06; B01D 53/1493; B01D 53/502; B01D 53/78; B01D 2251/404; B01J 20/04; B01J 20/041; B01J 20/22; B01J 20/223; B01J 20/28016; B01J 20/28057; B01J 20/28059; B01J 20/3021; B01J 20/3071; B01J 20/3085
USPC ................................ 252/189, 190, 193, 194
See application file for complete search history.

(56) References Cited

U.S. PATENT DOCUMENTS 309,328 A   12/1884  Adams
671,621 A    4/1901  Dodge
(Continued)

FOREIGN PATENT DOCUMENTS

GB    1394330          5/1975
JP    09278499 A    * 10/1997
(Continued)

OTHER PUBLICATIONS

English language machine translation of Arai et al. (JP 09278499 A). (Year: 1997).*
(Continued)

*Primary Examiner* — Matthew R Diaz
(74) *Attorney, Agent, or Firm* — Lewis Rice LLC (57) ABSTRACT

Systems and Methods to produce a lime hydrate sorbent composition formed of highly reactive lime hydrate (HRH) by adding compounds to the slaking water in a method that would produce a non-HRH, which will typically be a lime hydrate having citric acid reactivity as discussed above of more than ten seconds, to make the non-HRH an HRH, which is having a citric acid reactivity of less than or equal to ten seconds.

15 Claims, 2 Drawing Sheets

(51) Int. Cl.
*B01J 20/22* (2006.01)
*B01D 53/78* (2006.01)
*B01D 53/50* (2006.01)

(56) References Cited

U.S. PATENT DOCUMENTS

| | | |
|---|---|---|
| 1,613,341 A | 1/1927 | Carson |
| 1,679,149 A | 7/1928 | Berg |
| 1,954,211 A | 4/1934 | Kuntz |
| 2,894,820 A | 7/1959 | Rikard et al. |
| 3,366,450 A | 1/1968 | Waldeck |
| 3,839,551 A | 10/1974 | Dozsa et al. |
| 3,929,417 A | 12/1975 | Rosa et al. |
| 4,197,285 A | 4/1980 | Yang et al. |
| 4,274,842 A | 6/1981 | Lindau |
| 4,330,514 A | 5/1982 | Nagai et al. |
| 4,346,064 A | 8/1982 | Leon |
| 4,548,797 A | 10/1985 | Sauer et al. |
| 4,555,390 A | 11/1985 | Bhatia |
| 4,636,379 A * | 1/1987 | Bestek .............. C04B 2/06 423/640 |
| 4,666,690 A | 5/1987 | Sommerlad |
| 4,780,291 A | 10/1988 | Sayler et al. |
| 4,848,995 A | 7/1989 | Samish |
| 4,861,568 A * | 8/1989 | Robinson, Jr. ....... B01D 53/501 423/242.5 |
| 4,882,309 A * | 11/1989 | Kirchgessner ....... B01D 53/508 502/401 |
| 5,173,279 A | 12/1992 | Dumont et al. |
| 5,223,239 A * | 6/1993 | Moran .............. B01D 53/502 423/244.07 |
| 5,277,837 A | 1/1994 | Dumont et al. |
| 5,332,436 A | 7/1994 | Walker, Jr. et al. |
| 5,492,685 A | 2/1996 | Moran et al. |
| 5,705,141 A * | 1/1998 | Dumont ............. B01D 53/502 423/636 |
| 5,935,299 A | 8/1999 | Park et al. |
| 6,200,543 B1 | 3/2001 | Allebach et al. |
| 6,322,769 B1 * | 11/2001 | Langelin ............ C04B 2/04 423/635 |
| 6,685,902 B2 | 2/2004 | Morin et al. |
| 7,338,649 B2 | 3/2008 | Huege et al. |
| 7,744,678 B2 * | 6/2010 | Laudet .............. B01J 20/28059 95/137 |
| 8,518,353 B1 | 8/2013 | Neathery et al. |
| 8,709,348 B1 | 4/2014 | Neathery et al. |
| 8,715,600 B1 | 5/2014 | Gayheart |
| 9,517,471 B1 * | 12/2016 | Griffard ............. B01D 53/508 |
| 9,751,043 B1 | 9/2017 | Beihn et al. |
| 10,046,273 B1 | 8/2018 | Biehn et al. |
| 10,155,227 B2 | 12/2018 | Biehn et al. |
| 10,369,518 B2 * | 8/2019 | Tate ................ B01J 20/3021 |
| 2007/0082978 A1 | 4/2007 | Suzuki et al. |
| 2009/0229462 A1 | 9/2009 | Laudet et al. |
| 2009/0246117 A1 * | 10/2009 | Tilquin ............. C04B 2/08 423/640 |
| 2009/0246524 A1 * | 10/2009 | Ohmi ............... B01D 53/685 428/402 |
| 2010/0196239 A1 * | 8/2010 | Dumont ............. C04B 28/18 423/241 |
| 2011/0150755 A1 | 6/2011 | Euston |
| 2012/0134903 A1 | 5/2012 | Brasseur et al. |
| 2013/0156664 A1 | 6/2013 | Jankura et al. |
| 2016/0201903 A1 | 7/2016 | Brand et al. |
| 2016/0236144 A1 | 8/2016 | Rahlin |
| 2018/0264403 A1 | 9/2018 | Tate et al. |
| 2019/0127273 A1 * | 5/2019 | Lorgouilloux ....... C01F 11/02 |

FOREIGN PATENT DOCUMENTS

| | | | |
|---|---|---|---|
| JP | 10101331 A | * | 4/1998 |
| JP | 2002114543 A | * | 4/2002 |
| JP | 2007031212 A | | 2/2007 |
| JP | 2010180086 A | * | 8/2010 |
| JP | 2010202481 A | * | 9/2010 |

OTHER PUBLICATIONS

English language machine translation of Kawashima et al. (JP 10101331A). (Year: 1998).*
English language machine translation of Okada et al. (JP 2010180086 A). (Year: 2010).*
English language machine translation of Sato et al. (JP 2010202481 A). (Year: 2010).*
English language translation of Arai et al. (JP 09278499 A) (Year: 1997).*
Nolan, Paul S. and Brinker, Michael R., "Hydrated Lime for Control of Acid Gas Emissions from Coal-Fired Power Plants," (12 pages).
Gale, Thomas K., Cannon, Jared W., Nolan, Paul S., Brinker, Michael R., Brasseur, Alain and Laudet, Alain, "Hydrated Lime for SO3 Removal," Paper #128 (16 pages).
Srivastava, R.K., Miller, C.A., Erickson, C. and Jambhekar, R., "Emissions of Sulfur Trioxide From Coal-Fired Power Plants," Technical Publication, Riley Power Inc., a Babcock Power Inc. company, www.babbockpower.com, presented at POWER-GEN International 2002, Dec. 10-12, 2002, Orlando, Florida (20 pages).
"A Guidebook to Particle Size Analysis," Horiba Scientific, pp. 1-29 (17 pages).
Peterson, Joseph R., Maller, Gordon, Burnette, Andrew and Rhudy, Richard G., "Pilot-Seal Evaluation of Sorbent Injection to Remove SO3 and HCL," Managing Hazardous Air Pollutants State of the Art, Electric Power Research Institute TR-101890, printed Nov. 16, 2009, pp. 520-538 (22 pages).
Oates, Lime and Limestone: Chemistry and Technology, Production and Use, 2007, Chapter 17, pp. 192-198 (8 pages).
"Circulating Dry Scrubbers: A New Wave in FGD?," Power Engineering, pp. 1-6, available at http://www.power-eng.com/articles/print/volume-155/issues11, printed Sep. 2, 2015 (6 pages).
Bauer, Wolf G., The Lime Plant Operator, Hydration In Theory and Practice, Pit and Quarry, vol. 40, No. 1, pp. 168-170, Jul. 1947 (3 pages).

* cited by examiner

LIME HYDRATE WITH IMPROVED REACTIVITY VIA ADDITIVES

CROSS REFERENCE TO RELATED APPLICATION(S)

This application claims the benefit of U.S. Provisional Patent Application Ser. No. 62/700,143 filed Jul. 18, 2018. The entire disclosure of all the above documents is herein incorporated by reference.

BACKGROUND OF THE INVENTION

1. Field of the Invention

This disclosure relates generally to air pollution control processes aimed at controlling acid gases that are emitted from industrial, utility, incineration, or metallurgical process. Specifically, the formation of high reactivity calcium hydroxide (HRH) through the addition of various materials to a traditionally manufactured calcium hydroxide (lime hydrate).

2. Description of the Related Art

Many efforts have been made to develop materials for improved capability for cleaning or "scrubbing" flue gas or combustion exhaust. Most of the interest in such scrubbing of flue gas is to eliminate particular compositions, specifically acid gases, that contribute to particularly detrimental known environmental effects, such as acid rain.

Flue gases are generally very complex chemical mixtures which comprise a number of different compositions in different percentages depending on the material being combusted, the type of combustion being performed, impurities present in the combustion process, and specifics of the flue design. However, the release of certain chemicals into the atmosphere which commonly appear in flue gases is undesirable, and therefore the release of those specific components is generally regulated by governments and controlled by those who perform the combustion.

Some of the chemicals that are subject to regulation are certain acid gases. A large number of acid gases are desired to be, and are, under controlled emission standards in the United States and other countries. This includes compounds such as, but not limited to, hydrogen chloride (HCl), sulfur dioxide ($SO_2$) and sulfur trioxide ($SO_3$). Sulfur trioxide can evidence itself as condensable particulate in the form of sulfuric acid ($H_2SO_4$). Condensable particulate can also be a regulated emission.

Flue gas exhaust mitigation is generally performed by devices called "scrubbers". Scrubbers introduce chemical compounds into the flue gas. The compounds then react with the undesirable compounds which are intended to be removed by the reaction. Through these reactions, the undesirable compounds are either captured and disposed of, or turned into a less harmful compound prior to their exhaust, or both. In addition to controlling the emissions for environmental reasons, it is desirable for many combustion plant operators to remove acid gases from the plant's flue gas to prevent the acid gases from forming powerful corroding compounds which can damage flues and other equipment.

These acid gases can arise from a number of different combustion materials, but are fairly common in fossil fuel combustion (such as oil or coal) due to sulfur being present as a common contaminant in the raw fuel. Most fossil fuels contain some quantity of sulfur. During combustion, sulfur in the fossil fuel can oxidize to form sulfur oxides. A majority of these oxides forms sulfur dioxide ($SO_2$), but a small amount of sulfur trioxide ($SO_3$) can also be formed. Particularly in coal combustion, where the chemical properties of the coal are often highly dependent on where it is mined, the ability to mitigate the amount of sulfur oxides in flue gas is highly desirable as it allows for lower quality raw coal (which may be less expensive to produce and more abundant) to be burned sufficiently cleanly to lessen environmental impact and impact on machinery.

Figure 1:
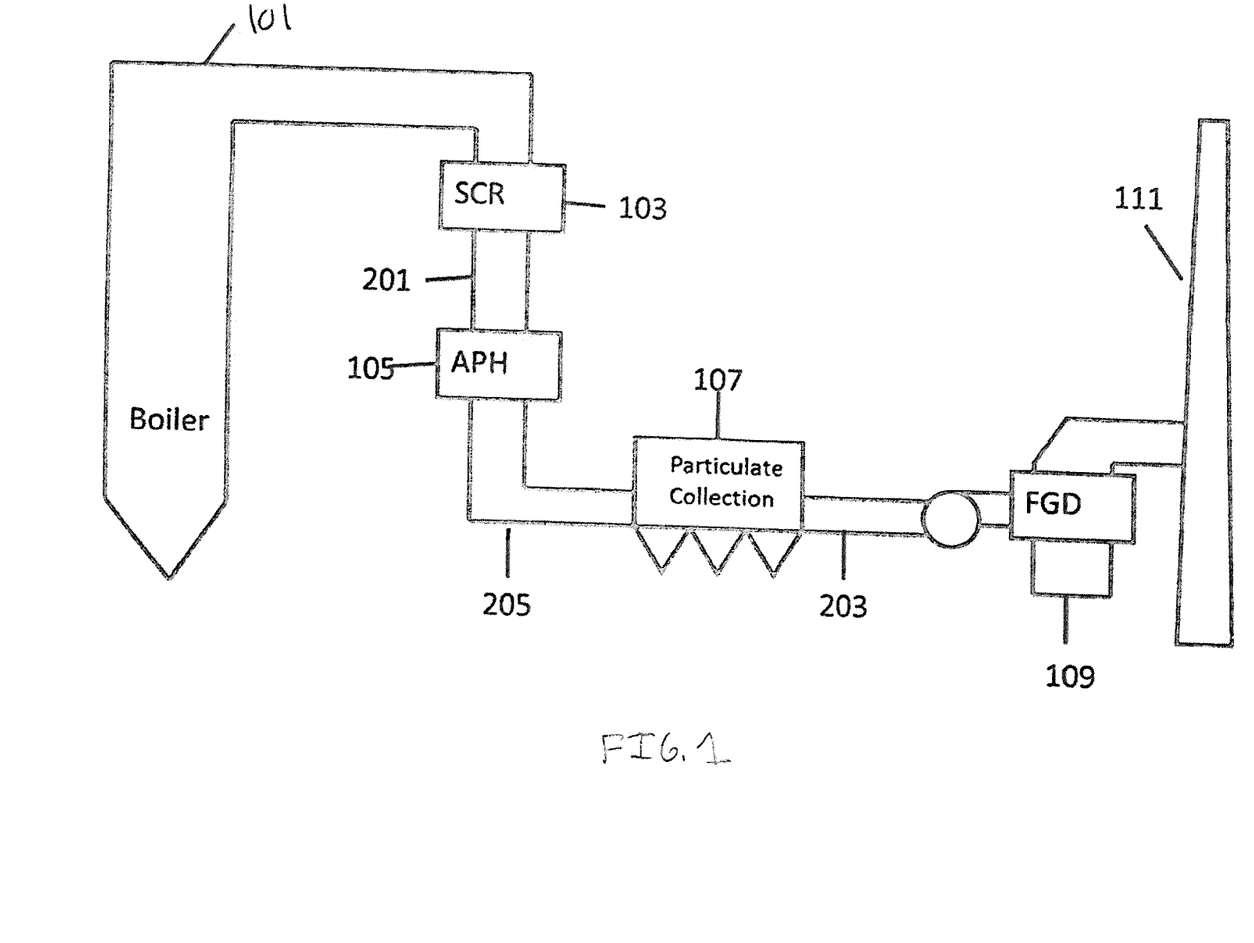
FIG. 1 provides a conceptual block diagram of an embodiment of a flue gas duct system as may be used in, for example, a coal fired power plant.

FIG. 1 shows a loose block diagram of an arrangement of a flue gas duct system such as can be used in a coal fired power plant. Generally, major components include the boiler (101), a Selected Catalytic Reduction (SCR) system for reducing NOx emissions (103), an Air Preheater (APH) (105), a particulate removal system (107) such as an electrostatic precipitator (ESP) or baghouse, a Flue Gas Desulfurization (FGD) unit (109), and then the exhaust stack (111).

While the process for controlling acid gases is relatively simple, mitigation of undesirable compounds can be very difficult. Because of the required throughput of a power generation facility, flue gases often move through the flue very fast and, thus, are present in the area of scrubbers for only a short period of time. Further, many scrubbing materials (sorbents) often present their own problems. Specifically, having too much of the sorbent can cause problems with the plant's operation from the sorbent clogging other components, building up on moving parts, or from undesired later reactions with other sorbents introduced later into the flue gas. The problems of accurate scrubbing are particularly acute where the amount of acid gases produced may vary, where the time for reaction is very short, where the reaction needs to occur "in-flight" within the flue gas, and where non-reacted sorbent can cause problems downstream. Many, if not all, of these concerns can occur in smaller facilities that may lack the scale to avoid them.

The presence of acid gases in flue gas also dictates operational decisions and increases operating costs with many tradeoffs. Minimization of $SO_2$ conversion to $SO_3$ may warrant the extra expense of low conversion catalyst in Selective Catalytic Reduction (SCR) equipment. Fear of forming sticky ammonium bisulfate (ABS) particles on Air Preheater (APH) internals will affect operation of the SCR in order to contain ammonia slip. The need to operate safely above dew point in the APH also increases heat rate and resulting energy costs. Greater air flow due to a high heat rate translates to additional power required to run the fans. Further, ash release from baghouse bags can be less efficient if the acid gases are untreated. Finally, units equipped with wet Flue Gas Desulfurization (FGD) will remove HCl, but the chlorides in the wet system can lead to corrosion issues or additional processing in water treatment.

Flue gas treatment has become a focus of electric utilities and industrial operations due to increasingly tighter air quality standards. As companies seek to comply with air quality regulations using cost-effective fuels, the need arises for effective flue gas treatment options. Alkali species based on alkali or alkaline earth metals are common sorbents used to neutralize the acid components of the flue gas. The most common of these alkalis are sodium, calcium, or magnesium-based. A common method of introduction of the sorbents into the gas stream is to use Dry Sorbent Injections (DSI). The sorbents are prepared as a fine or coarse powder and transported and stored at the use site. DSI systems pneumatically convey powdered sorbents to form a fine powder dispersion in the duct.

Much of the efficiency of DSI equipment is dictated by the ability of the injection system to have the sorbent contact the acidic components of the flue gas in-flight or while the flue gas is moving through the duct. Flue gas pathways are not homogeneous in nature, as structural components of the flue, wall effects, and combustion processes provide a flue gas stream that can be stratified horizontally or vertically. It is the job of the DSI system to put the sorbent where the acid gas travels and the sorbent needs to react sufficiently quickly with the target acid gases so as to have the reaction completed before the gas moves into a section of the duct where the spent sorbent is removed (if necessary). Sorbent which does not enter the zones where acid is concentrated is free to react with other components of the flue gas or remain unreacted until removed in particulate collection.

One proposed material for use in scrubbing of acid gases is increased use of calcium hydroxide (lime hydrate). It has been established that lime hydrate can provide a desirable reaction to act as a mitigation agent for a number of acid gases and lime hydrate systems have proven successful in many full-scale operations. Typically, lime hydrate has been used in sorbent beds, where the flue gas passes through or over the bed to react out the acid gases present therein. The problem with this type of use, however, is two-fold. Firstly, beds are limited to positions in which they can be used and secondly, it has inhibited lime hydrate from being used in in-flight injections systems, such as a DSI.

The problem with in-flight use of lime hydrate has been that traditional lime hydrate is often not reactive enough (that is, it does not react quick enough) to neutralize sufficient acid gas in-flight without the need to provide excess material the presence of which can cause downstream problems. This is not because the lime hydrate as a chemical does not react fast enough, but because in-flight reactivity appears to be very dependent on properties of the particulate compound which the lime hydrate is formed into.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Because of these and other problems in the art, there is described herein, among other things, air pollution control processes aimed at controlling acid gases that are emitted from industrial, utility, incineration, or metallurgical process. Specifically, the formation of high reactivity calcium hydroxide (HRH) through the addition of various materials to a traditionally manufactured calcium hydroxide (lime hydrate) that lacks the reactivity of HRH to improve the reactivity of traditionally manufactured lime hydrate allowing for it to be used in situations best suited for an HRH. It also discusses utilizing the same additives in the production of prior HRHs to produce even higher reactivity lime hydrates referred to as Super Reactive Hydrates (SRH).

There is described herein, in an embodiment, a method for forming a sorbent composition with improved acid gas reactivity comprising: forming a calcium oxide particulate; slaking the calcium oxide particulate with water and an additive to form calcium hydroxide particles; and forming a sorbent composition from the calcium hydroxide particles; wherein the additive is selected from the group consisting of: an additive to increase BET surface area; an additive to increase reactivity, or both additives; wherein the calcium hydroxide particles have a reactivity of less than 10 seconds and a BET surface area of 20 $m^2/g$ or greater; and wherein the reactivity is an amount of time it takes the calcium hydroxide particles to neutralize in citric acid, the citric acid having a mass greater than 10 times a mass of the calcium hydroxide particles.

In various embodiments of the method, the reactivity is less than 8 seconds, less than 4 seconds, less than 3 seconds, or between about 2 seconds and about 5 seconds.

In an embodiment of the method, the mass of the calcium hydroxide particles is about 1.7 grams and mass of citric acid is about 26 grams. In various embodiments of this method, the reactivity is less than 8 seconds, less than 4 seconds, less than 3 seconds, or between about 2 seconds and about 5 seconds.

In an embodiment of the method, the sorbent composition comprises at least 95% calcium hydroxide particles.

In an embodiment of the method, the additive to increase reactivity is selected from the group consisting of: sugars and lignosulfonate salts.

In an embodiment of the method, the additive to increase reactivity is between 0.75% to 1.25% of the calcium oxide feed by weight.

In an embodiment of the method, the additive to increase BET surface area is selected from the group consisting of: glycols derived from ethylene oxide and amines produced from reacting ethylene oxide with ammonia.

In an embodiment of the method, the additive to increase BET surface area is between 0.5% to 3% of the calcium oxide feed by weight.

There is also described herein, in an embodiment, a method for forming a sorbent composition with improved acid gas reactivity comprising: forming a calcium oxide particulate; selecting a slaking and milling process to form calcium hydroxide particles, the calcium hydroxide particles formed from the selected slaking and milling process having at least one of: a reactivity of more than 10 seconds or a BET surface area of 20 $m^2/g$ or less; altering the slaking process to include an additive, the calcium hydroxide particles formed from the altered slaking and milling process having both a reactivity of less than 10 seconds and a BET surface area of 20 $m^2/g$ or more; and forming a sorbent composition from the calcium hydroxide particles produced from the altered slaking and milling process; wherein the additive is selected from the group consisting of: an additive to increase BET surface area; an additive to increase reactivity, or both additives; and wherein the reactivity is an amount of time it takes the calcium hydroxide particles to neutralize in citric acid, the citric acid having a mass greater than 10 times a mass of the calcium hydroxide particles.

In an embodiment of the method, the additive to increase reactivity is selected from the group consisting of: sugars and lignosulfonate salts.

In an embodiment of the method, the additive to increase reactivity is between 0.75% to 1.25% of the calcium oxide feed by weight.

In an embodiment of the method, the additive to increase BET surface area is selected from the group consisting of: glycols derived from ethylene oxide and amines produced from reacting ethylene oxide with ammonia.

In an embodiment of the method, the additive to increase BET surface area is between 0.5% to 3% of the calcium oxide feed by weight.

DETAILED DESCRIPTION OF THE PREFERRED EMBODIMENT(S)

Lime hydrate particulate compounds have traditionally been manufactured according to a commonly known and utilized process. First, a lime feed (limestone) is heated in a lime kiln to a temperature above 825° C. where calcium oxide (commonly known as quicklime) is formed in accordance with the following formula:

$$CaCO_3(s) \rightarrow CaO(s) + CO_2(g)$$

The quicklime is then continuously grinded using a pulverizing mill until a certain percentage of all the ground particles meet a desired size (e.g., 95% or smaller than 100 mesh). Second, the quicklime meeting the desired size requirements is then fed into a hydrator, where the calcium oxide reacts with water (also known as slaking), and then quickly dried to form calcium hydroxide in accordance with the following equation:

$$CaO + H_2O \rightarrow Ca(OH)_2$$

Finally, the resultant calcium hydroxide (also known as lime hydrate) is then milled and classified until it meets a desired level of fineness or surface area for the target process.

As can be seen from the above, physical properties of the resultant lime hydrate particulate compound such as, but not limited to, particle size distribution, mean particle size, amount of lime hydrate versus other compounds, and other "structural" factors are often dictated by two primary elements of the process, the composition of the initial lime feed and the resultant milling and classifying processes.

The reaction of a particulate lime hydrate composition with an acid gas (such as $SO_2$) is generally assumed to follow the diffusion mechanism. The acid gas removal is the diffusion of acid gas from the bulk gas to the sorbent particles. Thus, the total surface area of the composition (which is related to the mean particle size and particle size distribution within the composition) is believed to be very important. Specially, increased surface area implies faster reaction time and thus, compositions with particles which are smaller than compositions with particles which are larger should be more reactive and better at acid gas mitigation. However, in practice, while high surface area (as represented by smaller particle size) is important, a small particle size composition alone has proven to not warrant a prediction of improved removal of acid gases. Thus, the old wisdom on how to make lime hydrate more reactive (which is simply to grind it into smaller and smaller particles) does not really work.

Instead, surface area of a lime hydrate particulate composition has now turned to a more sophisticated calculation which takes into account the shape of the particles within the composition to better determine the composition's reactivity to acid gases when injected as a dry sorbent. This calculation is referred to as the "BET surface area" of the lime hydrate particulate composition. BET surface area is generally a determination of surface area based on the theories of Stephen Brunauer, Paul Hugh Emmett, and Edward Teller (commonly called BET theory and discussed in S. Brunauer, P. H. Emmett and E. Teller, *J. Am. Chem. Soc.*, 1938, 60, 309, the entire disclosure of which is herein incorporated by reference). This methodology particularly focuses on the available surface area of a solid for absorbing gases—recognizing that surface area, in such circumstances, can be increased by the presence of pores and related structures. BET, therefore, takes into account that the total surface area of a spray of particles is not only dependent on the size of the particles, but is dependent on their "shape" in that particles with lots of holes (pores) can have a greater surface area than their size would imply.

Because of the recognition that BET surface area is a better indicator of available surface area for reaction, commercially available hydrate products have focused on obtaining lime hydrate with particularly high BET surface areas and this is believed to be necessary to provide for effective absorption. It is generally believed that the BET surface area really needs to be above 20 $m^2/g$ to be effective for acid gas removal, and in many recent lime hydrate compositions the BET surface area is above 30 $m^2/g$ to attempt to continue to improve efficiency. Two examples of lime hydrate compositions with increased BET surface areas are described in U.S. Utility Pat. Nos. 5,492,685 and 7,744,678, the entire disclosures of which are herein incorporated by reference.

While the industry is focused on BET surface area as a proxy for lime reactivity with acid gases, the BET surface area also does not seem to tell the whole story. In particular, while a BET surface area above a certain threshold seems to be necessary for good reactivity, continuing to try and increase the BET surface area has led to diminishing returns and in fact a reversal of reactivity in some cases. This has led to a belief that not only is the total BET surface area relevant, but the actual shape and style of the pores is also important. Specifically, the high pore volume of large pores (e.g. particles with large holes in them) has generally been believed to be required to minimize the pore plugging effect during reaction and, therefore, while BET surface area has been determined to be a reasonable proxy for effectiveness of lime hydrates in removal of acid gases, it is not an ideal one.

When the reaction time is limited and the speed of reactivity of the lime hydrate particulate composition is important, as it often is for duct areas that require in-flight capture of acid gases, it appears that the external surface area of the particle may actually be more important than the internal surface area (as measured by the BET gas adsorption process). The external surface area of the distribution of particles is an indication of the actual size of the hydrate particle as opposed to its available surface area. As the external or relative surface size increases the particle size generally decreases. In contrast to large particles that may have a high total surface area, it is the outer surface of ultrafine particles that hold most of the free reactants that are believed needed for the actual reaction. Thus, one is returned to the presumption that the smaller the individual particles in the composition, the more effective the removal of acid gases.

As discussed previously, however, this does not appear to tell the whole story. In many cases extremely small particles, while having high external surface area overall, are actually less reactive than particles which are larger and have less external surface area. Because it appears to be the case that either traditional measure of surface area (smaller overall particle size or BET surface area of the composition) cannot accurately predict effective highly reactive compounds, it has become necessary to instead classify particulate compositions based on their actual acid reactivity, instead of focusing on the surface area of the composition as a proxy.

Without being bound to any particular theory of operation, the problem with utilizing surface area of particulates as a proxy for reactivity appears to be that lime particulate compounds are not uniform and changes (particularly to distribution of particle size and BET surface areas) within the particulate distributions may be the best predictors of actual reactivity speed during dry injection type processes. No commercially viable lime particulate compound for use in acid gas reactivity includes particles of uniform size or surface area as such materials are commercially impractical (if not impossible) to produce. Instead, the compounds are made up of particles with a variety of sizes and surface areas. This phenomenon is well known and is part of analysis of particulate compounds. However, it has led to understanding that the properties of the compound viewed as a whole, and not necessarily any particular particles within it, may decide the reactivity.

Because of this, it has been desirable to determine the actual reactivity of specific lime hydrate particulate compounds. As discussed in U.S. patent application Ser. No. 15/344,173, the entire disclosure of which is herein incorporated by reference, in order to test reactivity of particular lime hydrate compounds, in an embodiment, the reactivity of the compound to a weak acid (such as, but not limited to, citric acid) provides for a reactivity time that is measurable with commercial instruments. The problem with determining reaction time to stronger acids is that the reaction can often be too quick to effectively measure at laboratory scaling. Thus, it is difficult to predict compositions that will function well without performing large scale pilot testing. In order to determine the citric acid reactivity of a particular lime hydrate composition, the amount of time it took 1.7 grams of lime hydrate to neutralize 26 grams of citric acid is measured. As a measurement of effectiveness, it is preferred that this value be less than or equal to 10 seconds in order to have a lime hydrate composition which is classified as being "highly reactive". However in an alternative embodiment it can be less than 8 seconds. It is more preferred that this value be 4 or less, 3 or less, 2 or less or 1 or less. Again, given the practical realities that production of improved material often results in a product having dramatically increased costs of products, utilizing current manufacturing techniques and for current emissions standards, in an embodiment particularly effective lime hydrates may be in the 2-5 second range, or, in another embodiment, in the 3-4 second range.

Highly Reactive Hydrate (or HRH) is a classification of lime hydrate compounds where the classification may be obtained based, in part, on citric acid reactivity. HRHs may be defined (in addition or in alternative to other methods) based on the citric acid reactivity of the compound (as discussed above) being less than 10 seconds or any of the faster time thresholds contemplated above. HRHs will also typically have BET surface areas above 20 $m^2/g$ making them suitable for at least some uses based solely on their BET surface area. However, many HRHs will have BET surface areas above 30 $m^2/g$ and such a particularly high BET surface area can actually serve to define an HRH in some cases.

HRHs are generally capable of acid neutralization in ways that traditional lime hydrates (being classified, for example, by being milled and classified solely to reach a target BET surface area of the resultant composition) are not. For example, HRH can typically be used in applications which require in-flight neutralization of acid gas, and can be used in applications where a lower quantity of hydrate needs to be used to avoid clogging downstream elements of the flue duct with particulates. Traditionally manufactured lime hydrates, even if milled and classified to segregate a portion which meets HRH level BET surface area criteria, cannot be used in these circumstances because they simply are insufficiently reactive.

Because the traditional logic of "mill and classify" until a resultant composition with the desired BET surface area characteristic is obtained does not consistently or predictably produce HRH compositions, the obtaining of HRH compositions has previously focused on modifications to the process of producing lime hydrate which result in the production of HRH compositions. Such processes for producing an HRH directly are described in, for example, U.S. Pat. No. 9,517,471 and U.S. patent application Ser. Nos. 14/289,278; 14/541,850; 15/466,097; and 15/596,911, the entire disclosure of all of which is herein incorporated by reference. These processes produce lime hydrate particulate compositions that can perform as necessary to be classified as HRH, generally by citric acid reactivity, BET surface area, or a combination of both. However, these processes are often more manufacturing intensive and require more stages of manufacturing than the manufacture of traditional lime hydrates.

While all the above are perfectly acceptable ways to produce HRH, it is desirable to be able to produce HRH without having to utilize any modified manufacturing methodology, but to instead to utilize the traditional mill, hydrate, mill and classify process as discussed above.

One way to utilize traditional milling and hydration techniques to produce an HRH is to add compounds to a non-HRH lime hydrate, which will typically be a lime hydrate having citric acid reactivity as discussed above of more than ten seconds, to make the non-HRH an HRH, which is having a citric acid reactivity of less than or equal to ten seconds. Additionally, these types of additions can provide for adding compounds to an already HRH lime hydrate, which is a lime hydrate having citric acid reactivity as discussed above of less than 10 seconds, to increase the reactivity of the HRH to twice what it was and less than or equal to 5 seconds.

The systems and methods discussed herein effectively allow one to "upconvert" traditional (or non-HRH) lime hydrate into HRH. This type of system would allow for facilities that lack the specific machinery or techniques for producing HRH according to any more specific methodology to produce HRH by simply manufacturing a lime hydrate by traditional processes, and then turning it into an HRH.

Further, some lime hydrates (whether HRH or not) may have additives added to them to provide particular beneficial secondary chemical properties to them having nothing to do with reactivity speed. For example, sodium compounds may be added to provide for a reduced resistivity of the HRH to allow the HRH to be used around an ESP as contemplated in U.S. patent application Ser. No. 16/235,885 the entire disclosure of which is herein incorporated by reference. While inclusion of these additives can allow for the lime hydrate composition to be used in specific applications where it may not have been useable before, these additives can result in a prior HRH material no longer reacting fast enough to be considered an HRH, or can result in a non-HRH lime hydrate compound reducing its reactivity even further. Regardless, what can happen is that the additive is necessary to provide one characteristic to the composition to make is suitable for a particular use, while the same additive reduces a different characteristic of the composition to the point where the composition is no longer useful for that same use. In these circumstances, the ability to both keep the characteristic added by the additive, and allow the material to maintain or improve its reactivity is desirable.

Finally, to the extent that a traditional lime hydrate can be "upconverted" to an HRH, those same processes can be used on products which are produced as HRH using the specific methods contemplated above (or other later developed methods) to further increase the reactivity of products which are already defined as an HRH to increase the reactivity of the HRH to previously unavailable levels. This can produce what is referred to herein as Super Reactive Hydrates (SRH), a subcategory of HRH, where the citric acid reactivity can be reduced to below 5 seconds, 4 seconds, 3 seconds, 2 seconds, 1 seconds, or lower and/or the BET surface area can be increased to 40 m$^2$/g, 50 m$^2$/g, 60 m$^2$/g, 70 m$^2$/g, or higher. SRH can be useable in reactions where traditional lime hydrate is simply unusable due to reaction speed making SRH effectively a whole new option for lime hydrate use in a variety of industries and applications.

Figure 2:
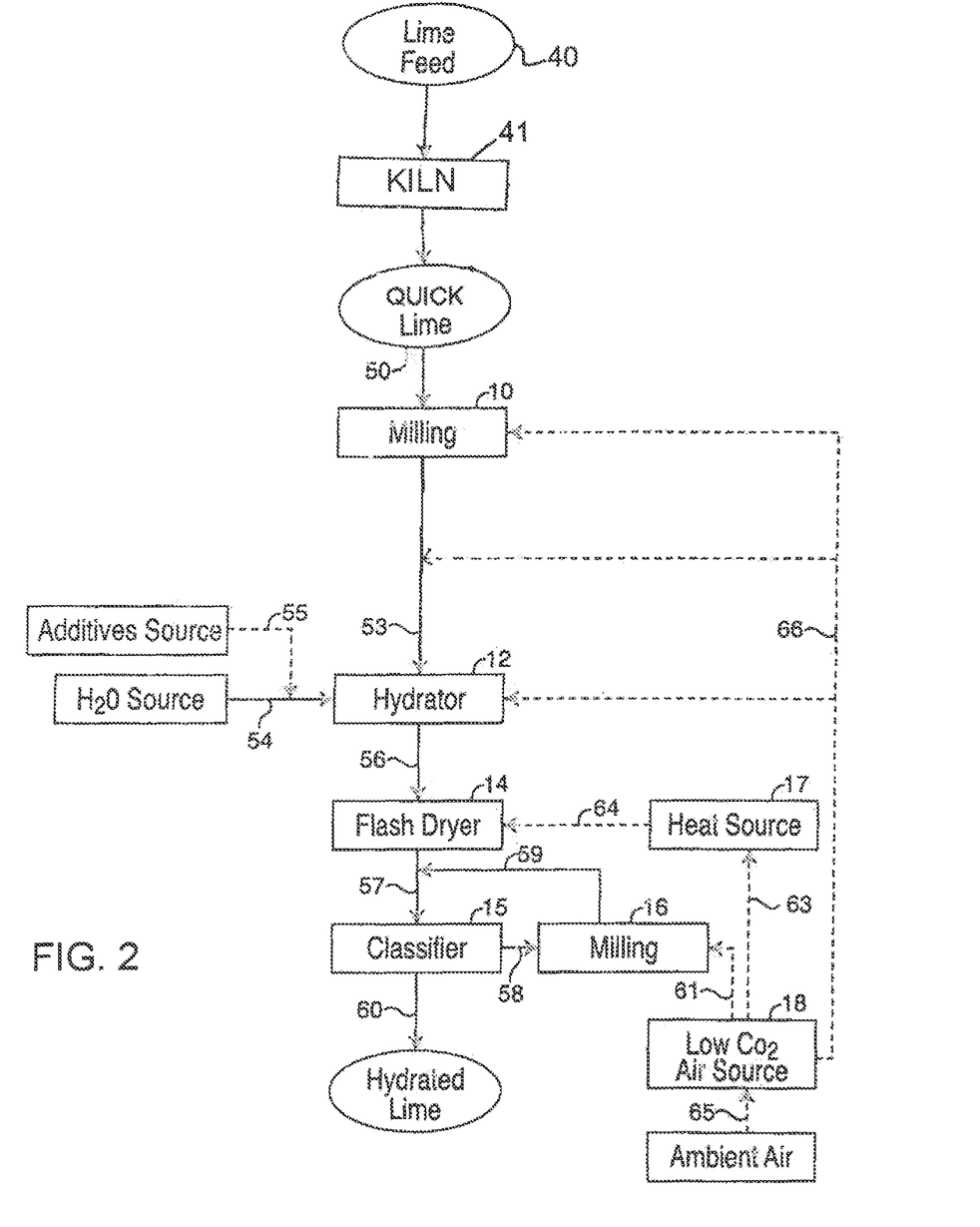
FIG. 2 depicts a block diagram of an embodiment of a method of manufacturing lime hydrate.

Turning now to FIG. 2, a general block diagram of the method of manufacturing lime hydrate including an additive addition for improving reactivity will be described in more detail in accordance with several embodiments. After a lime feed (40) has been heated in a lime kiln (41) to a temperature above 825° C., quicklime (50) is formed. The quicklime (50) is subjected to fine grinding or milling (10) to produce a fine lime (53). The fine lime (53) can be of varying sizes in different embodiments. Any grinding or milling is suitable, including, for example, fine grind cage mill, swing hammer mill, screen mill, etc. where the amount of milling produces the desired particle-size distribution. The fine lime (53) (and resultant steps) may also be produced and performed using the methodology of U.S. Utility patent application Ser. No. 15/596,911, the entire disclosure of which is herein incorporated by reference.

In an embodiment, the fine lime (53) will have a particle-size distribution of greater than about 80% minus 200 mesh. In another embodiment, it will be greater than 93.5% minus 200 mesh. It should also be noted that, although the prior description refers to particles passing through a mesh, this description and use of mesh merely refers to the common use of the term "mesh" as it relates to particle-size distribution. A mesh screen or sieve need not be used to measure or classify the particle-size (although it is suitable in some embodiments). Instead, an air classification system is preferably used.

As quicklime is generally not stable and, when cooled, will spontaneously react with $CO_2$ from the air until, after enough time, it is completely converted back to calcium carbonate. All the milling and classification of the quicklime (50) should preferably be produced entirely in a closed-circuit system to prevent air slaking and recarbonation (i.e., CaO to $CaCO_3$) from occurring, although a closed-circuit system is by no means required. In some embodiments, additional measures are employed to prevent recarbonation. For example, conditioned low $CO_2$ air (18) can be injected (66) into these systems to replace any air being drawn in and around process equipment bearings and seals. This conditioned air (18) is also very useful if the quicklime needs to be pneumatically conveyed. The process for conditioning this air is discussed more fully below and is also described in U.S. Utility Pat. No. 6,200,543 (the entire disclosure of which is incorporated herein by reference).

As noted above, the fine lime (53) then undergoes a hydration or slaking process. The hydration process generally utilizes a hydrator (12), and in a preferred embodiment, the fine lime (53) is combined with an excess of water (54), which may include any additives (55), and is rapidly mixed, which allows the fine lime (53) to react with the water (54) to form a wet or damp calcium hydroxide composition (56) which will now also include the additives (55). These additives (55) may be to provide different characteristics, as part of the "upconverting" process for making HRH from non-HRH, for making SRH from HRH, or for countering a decreased reactivity effect of another additive so included.

The water (54) for hydration is generally fed at a reasonably high temperature but low enough that the refined fine lime (53) is not overheated (burned). In this regard, the water feed (54) and hydrator (12) temperature should be maintained below the boiling point of water, and more preferably, at a temperature equal to or below 180° F. Utilizing an excess of water (i.e., more than necessary to react with the CaO but at a controlled percentage as known to those of ordinary skill in the art) also helps prevent overheating and burning and helps separate the individual particles. In any event, in one embodiment, the damp lime hydrate (56) that leaves the hydrator (12) has a residual moisture greater than 5%. Generally, the water level will be about 5-35% or about 10-25%. Alternatively, the residual moisture may be substantially lower and, in another embodiment, may be in the range of about 2% to about 4%. In this latter case, or even if residual water is lower, the residual water may actually be pushed off as steam via the heat of the slaking reaction. Effectively, correctly choosing the right amount of water can result in a "dry" hydrate being produced as the excess water provided is essentially the amount needed to cool the reaction and the act of cooling the reaction causes all the water to be driven off as steam.

As indicated above, traditional additives (55) may be included in the water feed (54) that is utilized in the hydration process (53). These additives are generally accelerators or retarders, which, as their names suggest, accelerate or retard the reaction of calcium oxide to calcium hydroxide. Any known accelerators or retarders can be utilized, including, alkaline-earth chlorides (e.g., barium chloride, calcium chloride, sodium chloride, potassium chloride, aluminum chloride, etc.), other salts (e.g., aluminum nitrate, sodium carbonate, sodium borate, potassium permanganate, potassium chlorate, table salt, Rochelle salt, etc.), acids (e.g., hydrochloric acid, sulfuric acid, oxalic acid, nitric acid, acetic acid, lactic acid, etc.), alkanols (e.g., mono-, di-, and tri-ethanolamine, dimethylethanolamine, methyl diethanolamine, triisopropanolamine, etc.), and sugars. Further examples of such accelerators and retarders, and their use in lime hydrate production can be found in U.S. Pat. Nos. 1,583,759; 1,649,602; 1,664,598; 2,193,391; 2,423,335; 2,437,842; 3,120,440; 4,626,418; 4,786,485; 5,173,279; 5,306,475; 5,308,534; 5,332,436; 5,502,021; 5,618,508; 5,705,141; 6,322,769; and 7,744,678 (the entire disclosures of which are incorporated herein by reference).

Other additives can be added to the slaking water to give the lime hydrate specific properties. For example, as contemplated in U.S. patent application Ser. No. 16/235,885 sodium metal and/or sodium compounds such as, but not limited to, sodium carbonate ($Na_2CO_3$), sodium hydroxide (NaOH), sodium bicarbonate ($NaHCO_3$), and/or Trona ($Na_2CO_3$—$NaHCO_3$-$2H_2O$), is added to a lime hydrate composition to lower the resistivity of the resultant hydrate compound.

After the lime has been slaked to form a damp lime hydrate (56), the damp lime hydrate (56) is then dried in a heat dryer (14) if that is necessary. In a preferred embodiment, the damp lime hydrate (56) is flash-dried using air (64) from an indirect heat source (17) with a temperature of about 550° F. to about 850° F. Using indirect heat prevents the hydrate composition from contacting the combustion gas which can occur if a direct heat source were to be used. This contact would result in the loss of some of the available calcium hydroxide. In any event, the dried lime hydrate (57) generally will have a residual moisture content of about 1% or less.

As noted above, the presence of $CO_2$ in air which then comes in contact with the lime hydrate can compromise the chemical integrity of the lime hydrate. While lime hydrate has greater moisture stability than calcium oxide, lime hydrate is perishable unless adequately protected from $CO_2$ absorption and the introduction of $CO_2$ into the lime hydrate can result in recarbonation (i.e., $Ca(OH)_2$ to $CaCO_3$). Thus, in some embodiments, the chemical purity can be further improved if the indirect heater (17) is supplied with conditioned air (63) that has a reduced $CO_2$ content. Examples of apparatuses and methods for such air conditioning (i.e., reduction of $CO_2$ content in the air stream) are disclosed, for example, in U.S. Pat. Nos. 5,678,959 and 6,200,543 (the entire disclosures of which are incorporated herein by reference). In one preferred embodiment, ambient air (65) (e.g., about 300 ppm $CO_2$) is fed into an air conditioner (18), resulting in conditioned air (63) with a $CO_2$ concentration of less than 100 ppm $CO_2$.

As noted above, conditioned air (66) with the same or different $CO_2$ concentrations as the conditioned air (63) for drying can also be fed into the mill (10) and/or hydrator (12) to help prevent recarbonation. Additionally, conditioned air (61) can be fed into any additional classifiers (15) and/or mills (16) as discussed more fully below.

After being dried (14) (as necessary), the dried lime hydrate (57) is then preferably classified (15) and milled (16). The dried lime hydrate (57) is first fed into a classifier (15). If it meets the desired properties (e.g. BET surface area, and particle size), dried lime hydrate (57) is utilized as the final lime hydrate product (60). Some of the dried lime hydrate (57), however, may not meet the desired properties. This non-final lime hydrate (58) is then fed into the mill (16) to be grinded, with the grinded lime hydrate (59) being fed back into the classifier (15) to determine if the material can be utilized as the final lime hydrate product (60). This process of milling (16) and classifying (15) can generally continue for as long as is necessary.

Again, in a preferred embodiment, the milling (15) and classification system (16) are conducted in a closed circuit system to prevent air carbonation from occurring. Conditioned air (61) (i.e., low CO2) can further be injected into the milling (15) and classification system (16) to replace any transient air being drawn into the process and prevent recarbonation.

The above process of manufacturing describes a process in which the drying (14), classifying (15), and milling (16) of the damp lime hydrate (56) are conducted independently. As would be understood by one of ordinary skill in the art, milling and classification system can be, and commonly are, integrated into one system wherein dried lime hydrate (57) is fed into the milling/classification system with injected conditioned air (61) and the resultant final lime hydrate product (60) has the desired properties as discussed above. Similarly, an integrated milling and classification system can be further integrated into a dryer wherein the damp lime hydrate (56) is fed into the milling/classification/dryer system with an indirect heat source (17) and the resultant final lime hydrate product (60) has the desired properties as discussed above.

In any event, embodiments of the manufacturing process described herein result in a final lime hydrate product (60) (sorbent compound) with a high purity and good reactivity. In particular embodiments, the final lime hydrate product (60) will generally have a purity of 96% calcium hydroxide or greater and a particle size of less than about 44 microns (325 mesh) for about 98% of the particles. However, these lime hydrates will also have a citric acid reactivity of less than 10 seconds and/or a BET surface area of above 30 $m^2/g$ for an HRH classified result or a citric acid reactivity of less than 5 seconds and/or a BET surface area of above 40 $m^2/g$ for an SRH product.

As contemplated above, the HRH products and SRH products produced by these systems and methods will typically be produced through the addition of the specific additives as part of the slaking water and the type of additional additives provided often depends on the characteristic the resultant lime hydrate would have that would inhibit it from being considered an HRH or SRH. As discussed above, HRH is generally defined as having citric acid reactivity of less than 10 seconds and/or a BET surface area of above 30 $m^2/g$ and an SRH is generally defined as having a citric acid reactivity of less than 5 seconds and/or a BET surface area of above 40 $m^2/g$. As it is preferred that both an HRH and SRH have both characteristics (citric acid reactivity and BET surface area) of their respective classification, additives will be discussed which can be used to increase BET surface area as well as additives which can be used to increase citric acid reactivity. It should be recognized, however, that it is very possible that utilizing an additive to increase one of the values will also increase the other and that the additives will typically be selected based on the desired outcome from the initial lime feed.

To increase BET surface area specifically, glycols derived from ethylene oxide such as, but not limited to, diethylene glycol or amines produces from reacting ethylene oxide with ammonia such as, but not limited to, tri-ethanolamine can be added to the slaking water. Either of these when added in levels of between about 0.5-3% by weight to the quicklime feed will typically be sufficient to raise a lime hydrate with a BET surface area less than or equal to 20 $m^2/g$ to a level above that and typically at or above 30 $m^2/g$.

These types of compounds are also particularly useful to counteract the negative effect of using sodium compounds to reduce resistivity. For example, utilizing a sodium addition at a rate of 2.3% of quicklime feed will typically reduce the BET surface area of a hydrate to around 20. Thus, an original hydrate formulation which is well above 20 or 30 can be reduced below that value quite readily. It has been found that an about 0.5% addition of diethylene glycol can essentially recover the entire lost amount and an increased addition can actually result in a lime hydrate that was formulated to have a BET surface area between 20 $m^2/g$ and 30 $m^2/g$ but was reduced below 20 $m^2/g$ due to the sodium addition, to now be above 30 $m^2/g$.

As contemplated above, the ability to utilize traditional hydrate manufacturing and then utilize additives to produce what is an HRH is very valuable. However, in certain applications, being able to produce an SRH can also be valuable. For example, if one was to produce a lime hydrate which already has a BET surface area above 30 $m^2/g$, one could now add the above additives to produce a lime hydrate with a BET surface area of 60 $m^2/g$ or more.

In order to specifically increase citric acid reactivity in a lime hydrate, which is believed to directly correspond to acid gas reactivity as discussed above, sugars, such as, but not limited, to monosaccharides (for example fructose, galactose, and glucose) or disaccharides (for example lactose, sucrose, and maltose) can be added to the lime hydrate such as through being provided as part of the slaking water. In another embodiment lignosulfonate salts (such as, but not limited to, calcium lignosulfonate) can alternatively or additionally added. Regardless of the material used, the additional levels will generally be about 0.75% to 1.25%, preferably about 1% of the CaO feed by weight.

Again, the ability to utilize traditional hydrate manufacturing and then utilize additives to produce what is an HRH is very valuable. However, an SRH can also be manufactured by applying the above additives to an HRH manufactured, for example, in accordance with the United States Patents and Patent Applications referenced previously. By inclusion of citric acid reactivity increasing compounds, the citric acid reactivity of HRH can be further increased. This allows for the creation of an SRH again and allows for a compound that can be used for activities that were previously not possible. It is believed that SRH is particularly valuable for in-flight neutralization and particularly in applications where contact times are very short or for applications outside acid gas neutralization in flue gas.

As should be apparent to one of ordinary skill, an embodiment of the present systems and methods also includes taking an existing HRH or traditional lime hydrate and adding both sets of additives to it. This can provide for increases in both parameters and produce a particularly reactive material.

HRH and SRH as discussed above could be used as part of a dry sorbent injection system into the off gas of an industrial plant, incinerator, or boiler that combusts sulfur and/or halogenated fuels. The DSI system for injecting hydrates will generally comprise a storage silo, feed valve, and a means of conveyance of the product that could use pressurized gas or vacuum. The conveying gas/hydrate mixture is conveyed within a pipe and fed into the flue gas stream to be treated. There can be one or multiple feed points into the flue gas as contemplated in FIG. 1 at points (201), (203), and/or (205) for example. The hydrate will generally be injected at temperatures below 2400° F. for capture of $SO_2$ and at temperatures below 1100° F. for capture of $SO_3$ and/or halogenated acids. However, this is not required.

HRH and SRH is beneficial especially when the end user can capitalize on the HRH's ability to rapidly neutralize acid gases or other target molecules in-flight, i.e., prior to forming a bed upon bags of a fabric filter or plates of an ESP. HRH can also provide benefit where a user needs to achieve high level removal in a short time and does not have the luxury of a long duct run. This can be particularly valuable where there is co-injection or HRH or SRH with a mercury sorbent where $SO_3$ must be removed prior to the mercury sorbent injection, and in applications with a short residence time prior to a small ESP (e.g., where point (205) is part of a short duct).

The qualifier "generally," and similar qualifiers as used in the present case, would be understood by one of ordinary skill in the art to accommodate recognizable attempts to conform a device to the qualified term, which may nevertheless fall short of doing so. This is because terms such as "planar" are purely geometric constructs and no real-world component is a true "plane" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric or similar meaning of the term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A method for forming a sorbent composition with improved acid gas reactivity comprising:
   forming a calcium oxide particulate;
   combining water, a sodium compound which will result in a reduction in a speed of reactivity of a resultant lime hydrate, and an additive to produce slaking water;
   slaking said calcium oxide particulate with said slaking water to form a damp lime hydrate;
   drying said damp lime hydrate with an indirect heat source to produce dried lime hydrate;
   milling and classifying said dried lime hydrate to produce calcium hydroxide particles; and
   forming a sorbent composition from said calcium hydroxide particles;
   wherein said additive is selected from the group consisting of: an additive to increase BET surface area; an additive to increase reactivity, or both additives;
   wherein said additive at least counteracts said reduction in said speed of said calcium hydroxide particles so that said calcium hydroxide particles have a reactivity of less than 10 seconds and a BET surface area of 20 $m^2/g$ or greater; and
   wherein said reactivity is an amount of time it takes said calcium hydroxide particles to neutralize in citric acid, said citric acid having a mass greater than 10 times a mass of said calcium hydroxide particles.

2. The method of claim 1 wherein said reactivity is less than 8 seconds.

3. The method of claim 1 wherein said reactivity is less than 4 seconds.

4. The method of claim 1 wherein said reactivity is less than 3 seconds.

5. The method of claim 1 wherein said reactivity is between about 2 seconds and about 5 seconds.

6. The method of claim 1 wherein said mass of said calcium hydroxide particles is about 1.7 grams and mass of citric acid is about 26 grams.

7. The method of claim 6 wherein said reactivity is less than 8 seconds.

8. The method of claim 6 wherein said reactivity is less than 4 seconds.

9. The method of claim 6 wherein said reactivity is less than 3 seconds.

10. The method of claim 6 wherein said reactivity is between about 2 seconds and about 5 seconds.

11. The method of claim 1 wherein said sorbent composition comprises at least 95% calcium hydroxide particles.

12. The method of claim 1 wherein said additive to increase reactivity is selected from the group consisting of: sugars and lignosulfonate salts.

13. The method of claim 1 wherein said additive to increase reactivity is between 0.75% to 1.25% of said calcium oxide particulate by weight.

14. The method of claim 1 wherein said additive to increase BET surface area is selected from the group consisting of: glycols derived from ethylene oxide and amines produced from reacting ethylene oxide with ammonia.

15. The method of claim 1 wherein said additive to increase BET surface area is between 0.5% to 3% of said calcium oxide particulate by weight.

* * * * *